United States Patent
Dillard

(10) Patent No.: US 10,131,010 B2
(45) Date of Patent: Nov. 20, 2018

(54) GAS TURBINE FUEL NOZZLE END COVER USING AU—NI BRAZE AND METHOD PRODUCING SAME

(75) Inventor: Gary J Dillard, Brownsboro, AL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 978 days.

(21) Appl. No.: 13/536,577

(22) Filed: Jun. 28, 2012

(65) Prior Publication Data

US 2014/0000266 A1    Jan. 2, 2014

(51) Int. Cl.
| | |
|---|---|
| *B23K 1/00* | (2006.01) |
| *B23K 1/008* | (2006.01) |
| *B23K 1/20* | (2006.01) |
| *F23R 3/46* | (2006.01) |
| *B23K 101/00* | (2006.01) |
| *B23K 103/04* | (2006.01) |

(52) U.S. Cl.
CPC ............ *B23K 1/0018* (2013.01); *B23K 1/008* (2013.01); *B23K 1/206* (2013.01); *F23R 3/46* (2013.01); *B23K 2201/001* (2013.01); *B23K 2203/05* (2015.10); *F23R 2900/00018* (2013.01)

(58) Field of Classification Search
CPC .... F23R 3/00; F23R 3/002; F23R 3/02; F23R 3/04; F23R 3/10; F23R 3/12; F23R 3/14; F23R 3/26; B23K 1/02; B23K 31/02; B23K 1/0018; B23K 1/008; B23K 1/206
See application file for complete search history.

(56) References Cited

U.S. PATENT DOCUMENTS

| | | | | |
|---|---|---|---|---|
| 4,412,453 A | * | 11/1983 | Nagai ................. | G01N 29/265 378/59 |
| 4,447,391 A | * | 5/1984 | Mizuhara .......... | B23K 35/3013 228/262.31 |
| 6,112,971 A | * | 9/2000 | Castaldo et al. .............. 228/126 | |
| 6,351,948 B1 | | 3/2002 | Goeddeke | |
| 6,410,161 B1 | * | 6/2002 | Li ........................ | B23K 1/0008 228/122.1 |

(Continued)

FOREIGN PATENT DOCUMENTS

JP        59110492 A  *  6/1984

OTHER PUBLICATIONS

International Search Report Application No. PCT/US13/035436, dated Jan. 17, 2014.

*Primary Examiner* — Craig Kim
(74) *Attorney, Agent, or Firm* — Cantor Colburn LLP

(57) ABSTRACT

A brazed end cover assembly for a gas turbine combustor using Au—Ni braze is disclosed. The end cover assembly may include an end cover with openings, a flow insert, first and second gaps between the end cover and the flow insert, and first and second braze joints formed at the first and second gaps, wherein the braze materials used comprises Au and Ni. A method of brazing a flow insert into an end cover is also disclosed. The method may include providing an end cover and a flow insert with first and second gaps therebetween; applying a braze material to an outer surface of the flow insert, wherein the braze material comprises Au and Ni; inserting the flow insert into the end cover; heating the assembly to a brazing temperature for some time; and cooling the resulting brazed assembly to room temperature.

20 Claims, 5 Drawing Sheets

(56) References Cited

U.S. PATENT DOCUMENTS

| | | | |
|---|---|---|---|
| 6,863,995 B2 * | 3/2005 | Sandin | B23K 35/3013 |
| | | | 228/262.31 |
| 7,287,382 B2 * | 10/2007 | Henriquez | 60/739 |
| 7,416,108 B2 | 8/2008 | Philip | |
| 7,658,315 B2 | 2/2010 | Budinger et al. | |
| 7,824,510 B2 * | 11/2010 | Hu et al. | 148/528 |
| 7,926,178 B2 | 4/2011 | Thomson et al. | |
| 2008/0135604 A1 | 6/2008 | Ng et al. | |
| 2009/0255116 A1 | 10/2009 | McMasters et al. | |
| 2010/0066035 A1 | 3/2010 | Berry et al. | |

* cited by examiner

GAS TURBINE FUEL NOZZLE END COVER USING AU—NI BRAZE AND METHOD PRODUCING SAME

FIELD OF THE DISCLOSURE

The present disclosure generally relates to gas turbine engines and, more particularly, relates to gas turbine engine combustors.

BACKGROUND OF THE DISCLOSURE

A gas turbine engine typically includes a compressor, at least one combustor, and a turbine. The air is pressurized in a compressor during operation and is then directed toward the combustor. The combustor commonly comprises multiple fuel nozzles to mix liquid or gas fuel with the compressed air efficiently before igniting the resulting mixture to create high temperature, high pressure combustion gases in a combustion liner of the combustor. The hot combustion gases are then directed via a duct towards a turbine, which is rotatably driven as the high temperature, high pressure combustion gases expand in passing over blades forming the turbine. The turbine produces work to generate engine thrust to propel an aircraft in flight, or to power a load in an electrical generator.

Since the operating pressure of the combustor is high, the combustion liner is contained within a case or pressure vessel. Fixed to this case is a fuel nozzle end cover that typically directs the flow of fuel from a fuel source to the fuel nozzles which injects the fuel into the combustion liner. Different fuels may be used for combustion depending on the type of performance and emission desired from the combustor. As a result, the end cover must be capable of preventing premixing of different fuel types and/or atomizing air within the end cover.

To meet the above requirement for a fuel nozzle end cover to deliver multiple fuel types separately, a flow insert is attached to and becomes part of the end cover using multiple braze joints therebetween. In a typical brazing process, the end cover and the flow inserts are first machined having very tight tolerance so that a diametrical gap therebetween is not more than a predefined number. For example, 0.005 inches may be the predefined number, but other dimensions are certainly possible. Braze wire, paste or foil, which is of an acceptable material for bonding the end cover and the flow inserts, is then taped or injected by syringe into the gap between the two components. Both components are then placed in a furnace, heated and cooled so that the insert bonds to the end cover to produce a joint capable of handling the temperature gradients and pressures applied to the end cover.

Although brazing provides the desired joint between the end cover and the flow insert, the process has its drawbacks. Depending on the configuration of the end cover, the resulting joints often cannot be inspected visually. However, detection of braze voids within a braze joint is significant to the detection and avoidance of flawed end covers. Furthermore, the braze joints are exposed to wide temperature ranges, for example between 0 and 800 degrees Fahrenheit, during operation of the gas turbine. This large temperature gradient in combination with high internal pressures, for example 250 $lb/in^2$ or more, exerts increased stresses at the braze joints and potential failure of same. Braze joint failures could lead to leakage of fuel into hot gas cavities, and cause premature mixing and burning thereof within the end cover. The ensuing end cover failures could in turn result in catastrophic turbine failure, such as a forced outage. Thus, regular inspection of braze joint integrity is important during regular maintenance of the turbine. Accordingly, nondestructive examination procedures are required, such as pressure testing, X-ray, and ultrasonic inspection.

However, because the end cover is a thick plate, for example such enclosure often having a thickness of 4.5 inches or more, X-ray inspection is usually not possible for the end cover if the brazing filler material is a nickel alloy due to the low density of nickel. To better answer the challenges raised by the gas turbine industry to produce reliable and high-performance gas turbines, it is therefore desirable to find a brazing filler material which would provide the finished end cover with X-ray inspection capability. Further, a process to produce an end cover with X-ray inspection capability is desirable as well.

SUMMARY OF THE DISCLOSURE

In accordance with one aspect of the present disclosure, a brazed end cover assembly for a gas turbine combustor is therefore disclosed. The brazed end cover assembly may include an end cover which has first and second surfaces and which has a plurality of openings for receiving a flow insert, said opening having a stepped inner hole which has at least first and second inner diameters; a flow insert for being received in the stepped inner hole, wherein the flow insert having first and second ends and nozzle hole defined therethrough, and an outer surface of the flow insert being stepped so as to have at least first and second outer diameters generally corresponding to the inner diameters of the stepped inner hole; a first braze joint formed at a first gap between the end cover and the flow insert using a first braze material which comprises Au and Ni; and a second braze joint formed at a second gap between the end cover and the flow insert using a second braze material which comprises Au and Ni.

In a refinement, the flow insert and end cover of the brazed end cover assembly may be formed from stainless steel.

In another refinement, the brazed end cover assembly may further comprise at least first and second fluid inlets extending from the second surface.

In another refinement, the brazed end cover assembly may further include a first manifold which may be in fluid communication with said first fluid inlet; and a second manifold which may be in fluid communication with said second fluid inlet.

In another refinement, the first and second braze materials for the brazed end cover assembly may comprise no less than 65% Au and no more than 35% Ni.

In still another refinement, the first and second braze materials for the brazed end cover assembly may comprise no less than 75% Au and no more than 25% Ni.

In accordance with another aspect of the present disclosure, a gas turbine engine is disclosed. The gas turbine engine may include a compressor; a plurality of combustors; and a turbine. The combustor may have a brazed end cover assembly which may include an end cover which has first and second surfaces and which has a plurality of openings for receiving a flow insert, said opening having a stepped inner hole which has at least first and second inner diameters; a flow insert for being received in the stepped inner hole, wherein the flow insert having first and second ends and nozzle hole defined therethrough, and an outer surface of the flow insert being stepped so as to have at least first and second outer diameters generally corresponding to the inner diameters of the stepped inner hole; a first braze joint formed at a first gap between the end cover and the flow insert using a first braze material which comprises Au and Ni; and a second braze joint formed at a second gap between the end cover and the flow insert using a second braze material which comprises Au and Ni.

In a refinement, the gas turbine engine may include flow inserts and end cover, which are formed from stainless steel.

In another refinement, the gas turbine engine may include the brazed end cover assembly which further comprises at least first and second fluid inlets extending from the second surface.

In another refinement, the gas turbine engine may include the brazed end cover assembly which further includes first and second manifolds. The first manifold may be in fluid communication with said first fluid inlet; while the second manifold may be in fluid communication with said second fluid inlet.

In another refinement, the gas turbine engine may include the first and second braze materials which may comprise no less than 65% Au and no more than 35% Ni.

In still another refinement, the gas turbine engine may include the first and second braze materials which may comprise no less than 75% Au and no more than 25% Ni.

In accordance with still another aspect of the present disclosure, a method of brazing a flow insert into an end cover is disclosed. The method may include providing an end cover which has first and second surfaces and which has a plurality of openings for receiving a flow insert, wherein the opening having a stepped inner hole which has at least first and second inner diameters; providing a flow insert for being received in the stepped inner hole, wherein the flow insert having first and second ends and nozzle hole defined therethrough, and an outer surface of the flow insert being stepped so as to have at least first and second outer diameters generally corresponding to the inner diameters of the inner hole; wherein there are first and second gaps between the end cover and the flow insert; applying a braze material to pre-determined portions of the outer surface of the flow insert, wherein the braze material comprises Au and Ni; inserting the flow insert with the braze material applied thereto into the respective inner hole of the end cover; heating the assembly of the flow insert and end cover to a brazing temperature; maintaining the brazing temperature for a pre-determined time; and cooling the resulting brazed assembly of the flow insert and the end cover from the brazing temperature to a pre-determined end temperature at a pre-determined rate.

In a refinement, the method may include cleaning the surfaces to be razed with vacuum heating before brazing to remove surface oxide.

In another refinement, the method may include braze wire as the braze material.

In another refinement, the method may include braze paste as the braze material.

In another refinement, the method may include braze foil as the braze material.

In another refinement, the method may include braze material which comprises no less than 65% Au and no more than 35% Ni.

In another refinement, the method may include braze material which comprises no less than 75% Au and no more than 25% Ni.

In another refinement, the method may further comprise, after the cooling step, surface treating the assembly by pressure blasting with glass bead.

In still another refinement, the method may further comprise inspecting the brazed joins, determining defective braze joints, and repairing the defective braze joints by re-applying the braze material and re-brazing the assembly.

Further forms, embodiments, features, advantages, benefits, and aspects of the present disclosure will become more readily apparent from the following drawings and descriptions provided herein.

Before proceeding with the detailed description, it is to be appreciated that the following detailed description is merely exemplary in nature and is not intended to limit the invention or the application and uses thereof. In this regard, it is to be additionally appreciated that the described embodiment is not limited to use in conjunction with a particular type of gas turbine. Hence, although the present disclosure is, for convenience of explanation, depicted and described as shown in certain illustrative embodiments, it will be appreciated that it can be implemented in various other types of embodiments and equivalents, and in various other systems and environments.

DETAILED DESCRIPTION OF THE DISCLOSURE

Figure 1:
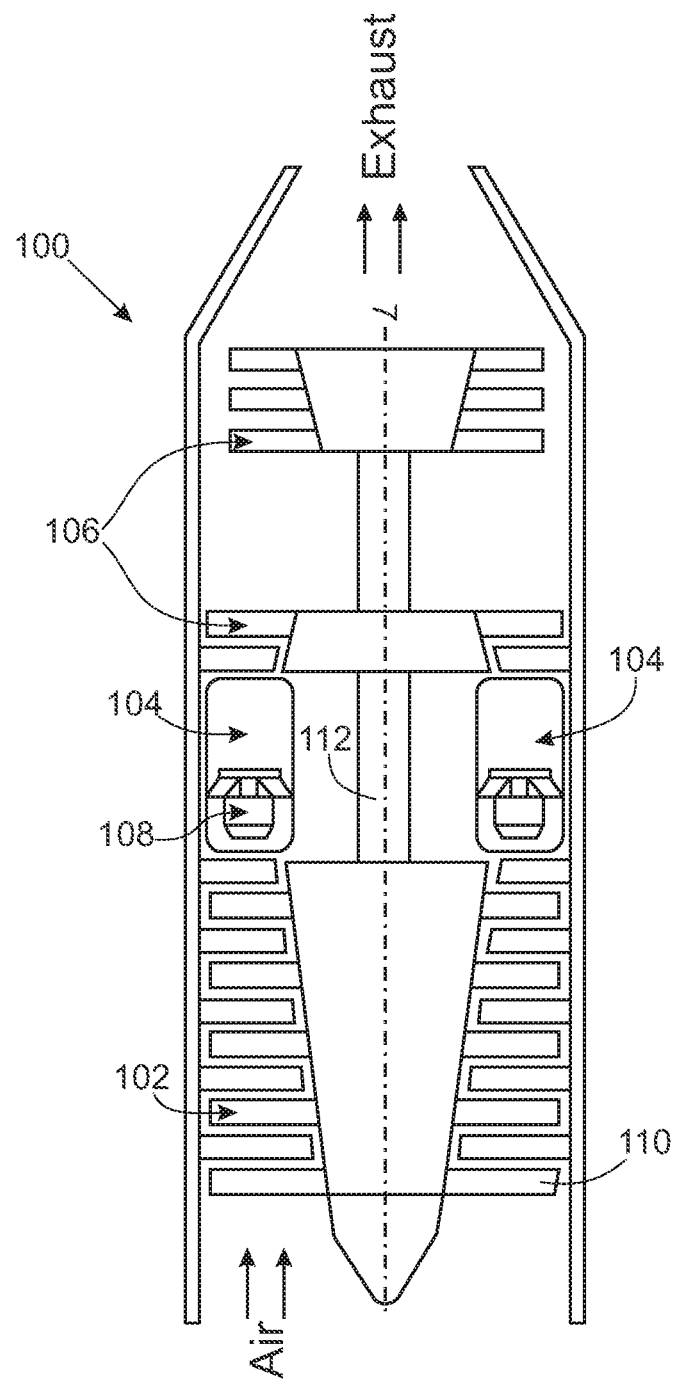
FIG. 1 is an exemplary gas turbine engine.

Referring now to the drawings, and with specific reference to FIG. 1, there is depicted an exemplary industrial gas turbine 100. In this example, the industrial gas turbine 100 may include a compressor 102, a plurality of combustors 104, and a turbine 106, each disposed coaxially about an engine centerline axis L. The combustors 104 typically include multiple fuel nozzles 108. During an operation, air is pressurized in the compressor 102, and mixed with fuels, which are transported through fuel nozzles 108, in the combustor 104 to generate hot gases. The hot gases flow through the turbine 106, which extracts energy from the hot gases. The turbine 106 then powers the compressor 102 and the fan section 110 through a rotor shaft 112. In power generation applications, the turbine 106 may connect to an electric generator to generate electricity.

Figure 2:
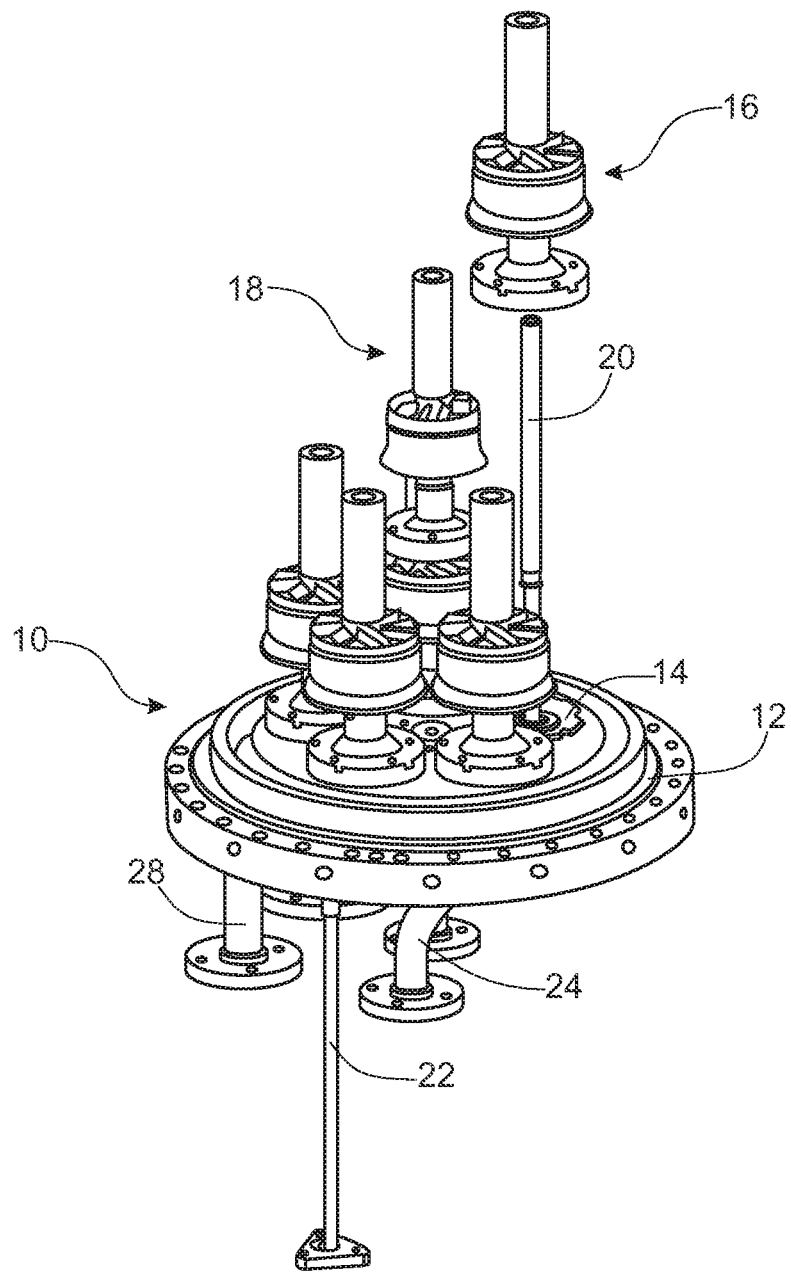
FIG. 2 is a partially exploded, perspective view of a brazed end cover assembly according to the present disclosure, together with fuel nozzles.

In industrial gas turbines of this type, the fuel nozzles 108 typically extend through an end cover assembly 10 as illustrated in FIG. 2. The end cover assembly 10 locates at the rearward or proximal end of a combustor and feeds gaseous fuel, liquid fuel, air and/or water through to the combustor through internal passages and nozzles. In this example, end cover assembly 10 may include an end cover 12, a flow insert 14, a plurality of braze joints between the end cover 12 and the flow insert 14, each of which will now be described in greater detail in the paragraphs that follow.

The end cover assembly 10 may receive a plurality of outer fuel nozzle assembles 16 arranged in a circular array about a longitudinal axis of the combustor, and one center fuel nozzle 18. Typically, the center fuel nozzle 18 is used to provide a stable flame source to the combustor. A nozzle sleeve 20 and a nozzle tip 22 may connect with any of the outer fuel nozzle assemblies 16. In addition, a first fluid inlet 24 may be in fluid communication with a first manifold 26 (not shown) while a second fluid inlet 28 may be in fluid communication with a second manifold 30 (not shown). Although the end cover assembly 10 and its components are shown as having certain relative dimensions, such dimensions are only exemplary and other relative dimensions are possible. Moreover, although the end cover assembly 10 is shown to have 5 flow inserts, other numbers of flow inserts are possible. Outer fuel nozzle assemblies 16 and the center nozzle 18 may conventionally be configured to supply premix gaseous fuel, liquid fuel, water injection, atomizing air and/or diffusion fuel to the combustor.

Figure 3:
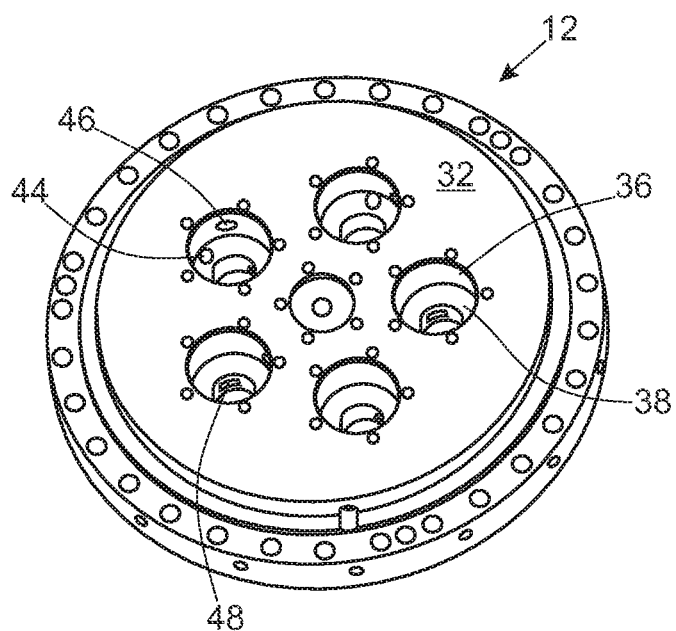
FIG. 3 is a perspective view of an end cover (before brazing) according to the present disclosure.

Turning now to FIG. 3, an end cover 12 is shown before brazing for the end cover assembly. End cover 12 may comprise a first surface 32 which is the top face, a second surface 34 which is the bottom face (not shown), and a plurality of openings 36 for receiving flow inserts 14. The opening 36 may have a stepped inner hole 38 which extends between first surface 32 and second surface 34. Stepped inner hole 38 may have at least first diameter 40 (not shown) and second inner diameter 42 (not shown). On the surface of the stepped inner hole 38 there are a plurality of feed holes to provide fluid from the end cover to the flow insert. A first feed hole 44 is in fluid communication with the first manifold 26; a second feed hole 46 is in fluid communication with the second manifold 28; and a third feed hole 48 is in fluid communication with the third manifold 50 (not shown).

Although as shown in FIG. 3 openings 36 comprise five openings, other numbers of openings are possible. Even though FIG. 3 depicts three different types of feed holes at specific locations in end cover 12, other numbers of and different locations for the feed holes are possible. In addition, although the end cover 12 and its components are shown as having certain relative dimensions, such dimensions are only exemplary and other relative dimensions are possible.

Figure 4:
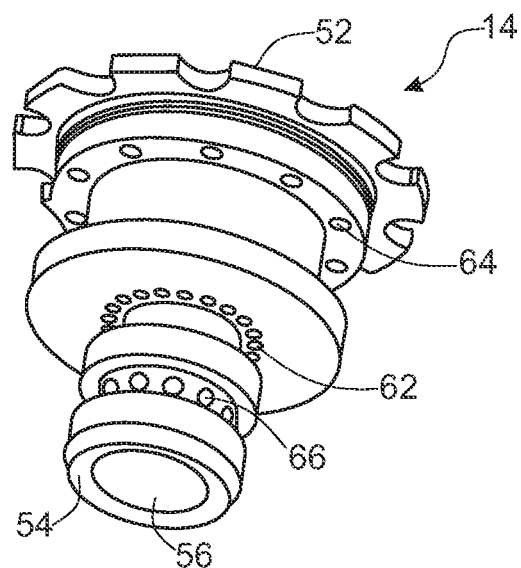
FIG. 4 is a perspective view of a flow insert (before brazing) according to the present disclosure.

FIG. 4 illustrates in detail an embodiment of the flow insert 14 before brazing for the end cover assembly 10. The flow insert 14 may include a first end 52, a second end 54, and a nozzle hole 56 defined through first and second ends for receiving the outer fuel nozzle assembly 16. The outer surface of the flow insert 14 is stepped in such a way that it has at least first and second outer diameters (58 and 60, not shown) generally corresponding to inner diameters (40 and 42) of stepped inner hole 38 in end cover 12. The flow insert 14 may have a plurality of first, second, and third inlets (sequentially 62, 64, and 66) in fluid communication with first, second, and third feed holes (sequentially 44, 46, and 48) of the stepped inner hole 38, respectively, for individually receiving gaseous fuel, liquid fuel, water, atomizing air, and/or premixed gas fuel, and with suitable connecting passages for supplying each of the above mentioned fluids to the outer fuel nozzle assembly 16. Although the flow insert 14 and its components are shown as having certain relative dimensions, such dimensions are only exemplary and other relative dimensions are possible.

Figure 5:
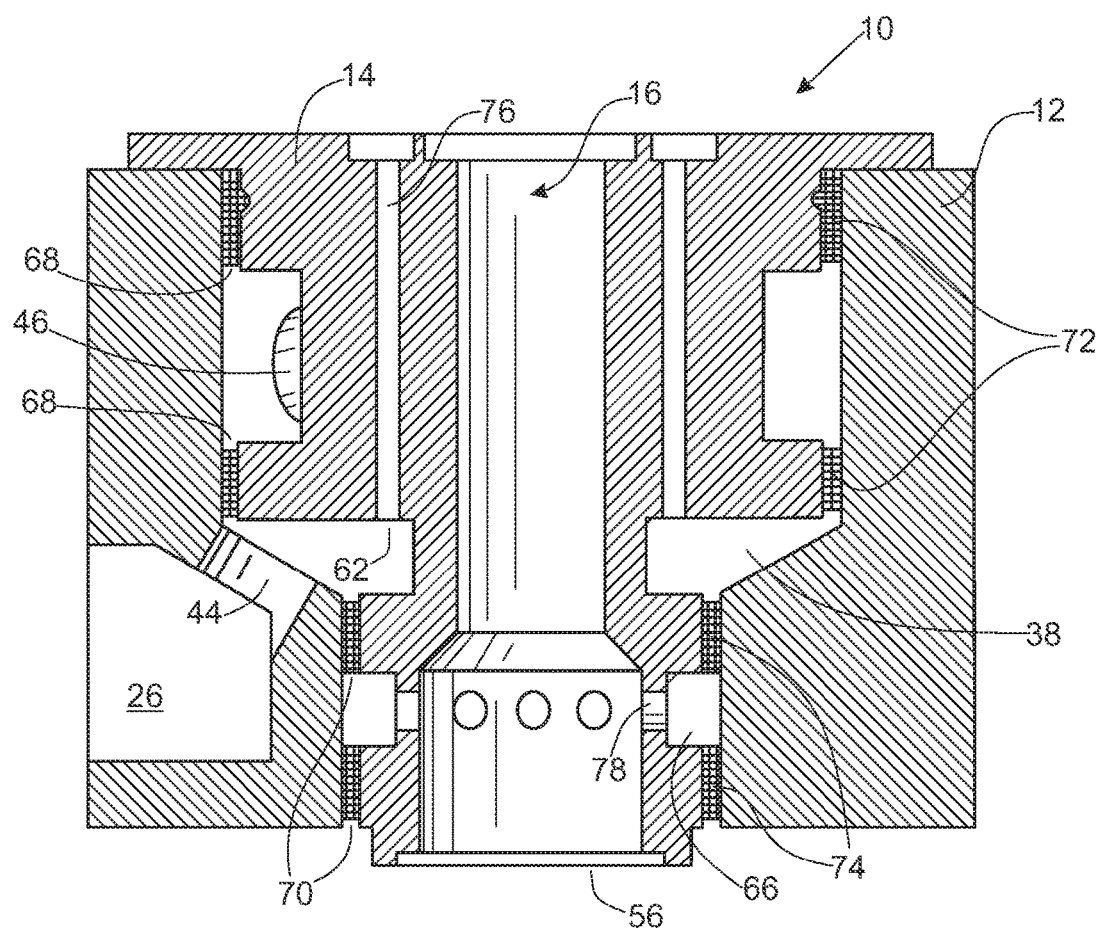
FIG. 5 is a partial, schematic cross-section of a brazed end cover assembly according to the present disclosure, illustrating a flow insert connected to an end cover with braze joints.

FIG. 5 is a partial, schematic cross-sectional view of a brazed end cover assembly 10 made from the end cover 12 in FIG. 3 and the flow insert 14 in FIG. 4 after brazing. As described above, the stepped inner hole 38 may have at least first inner diameter 40 and second inner diameter 42, while the flow insert 14 may have first outer diameter 58 and second outer diameter 60. There is a first gap 68 between the first inner diameter 40 of the inner stepped hole 38 and the first outer diameter 58 of the flow insert 14, while there is a second gap 70 between the second inner diameter 42 of the inner stepped hole 38 and the second outer diameter 60 of the flow insert 14. A first braze joint 72 is formed between the inner stepped hole 38 and the flow insert 14 at the first gap 68 while a second braze joint 74 is formed between the inner stepped hole 38 and the flow insert 14 at the second gap 70. The first and second braze joints 72 and 74 not only connect the flow insert 14 to the end cover 12, but also define and isolate the structural connections between and among the manifolds, the feed holes, the passages, the fluid inlets, the flow insert 14 and the outside of the end cover 12 for fluid flow. For example, the first passage 76 in the flow insert 14 connects the first inlet 62 with the outer fuel nozzle assembly 16 and receives the first fluid from the first manifold 26 via the first feed hole 44 of the stepped inner hole 38. The second passage 78, on the other hand, is defined between the third inlet 66 and the outer fuel nozzle assembly 16 and supplies the third fluid from the third manifold 50 via the third feed hole 48 to the outer fuel nozzle assembly 16. The presence of the first and second braze joints 72 and 74 also prevent the mixing of different fluids within the end cover assembly 10.

The dimension of the first and second gaps 68 and 70 may be chosen according to the engineering and manufacturing knowledge of the braze alloy material used. If a braze gap is too big and forms a eutectic formation, it may fail and lead to a braze joint leak and/or combustion end cover failure. Thus, the first and second gaps 68 and 70 should be controlled to be in a pre-determined range, for example, the range between 0.001-0.005 inches diametrical, for the matching flow insert and end cover. To accomplish this conformity, the variability of both the end cover 12 and the flow inset 14 should be controlled. Variability can be reduced with operator training and upgrades in machine and tool, and with treatments such as heat treatment to reduce distortions in parts. Although the end cover 12, flow insert 14 and their corresponding components are shown as having certain relative dimensions, such dimensions are only exemplary and other relative dimensions are possible.

Both the end cover 12 and the flow insert 14 may be made from suitable stainless steels, for example, 304L stainless steel.

The braze filler material of the present application is a gold-nickel (hereinafter referred to as Au—Ni) alloy. For example, a 82.5Au-17.5Ni braze alloy, which has a melting point at about 1742° F., may be used as the braze filler for the present disclosure. In another embodiment, a 68Au-22Cu-8.9Ni-1.0Cr-0.1B alloy, which melts between about 1742 F and about 1796, may be used as the braze filler for the present disclosure. In still another embodiment, a 75Au-25Ni alloy, which melts between about 1742 F and about 1814, may be used as the braze filler for the present disclosure. Generally, no more than 35% Ni is used in the Au—Ni alloy as the braze filler material for the present disclosure, since higher Ni/Au ratios have a wider than accepted melting range and high viscosity.

The Au—Ni braze has many properties as a braze filler which are superior to a Ni braze. For example, the density of the Au—Ni braze is heavier than that of the Ni braze so that it is easier to recognize a braze void using X-ray detection method when using the Au—Ni braze than using the Ni braze. Furthermore, the Au—Ni braze has higher ductility than the Ni braze and higher ductility of braze materials help prevent fatigue failure in braze joints.

In one embodiment, the weight percentage of Au and Ni in the brazing filler may be selected based upon the intended use and operating conditions of the brazed end cover assembly 10. In particular, the weight percentages may be selected such that the resulting brazing alloy has a high impact resistance and high ductility after brazing and the mechanical properties of the substrate are not negatively affected, for example by way of phase transitions at high brazing temperatures.

The braze materials disclosed herein may be provided in various forms. For example, the braze materials may be provided as homogenous compositions comprising Au and Ni. In another embodiments, the braze materials may be provided as wires. In other embodiments, the braze materials may be provided as powders. In still other embodiments, the brazing alloy may be provided as layered or laminated films or foils. When used in the powder, wire, film or foil forms, the braze material may form a substantially homogeneous alloy upon being heated to the appropriate brazing temperature for a pre-determined time. Those skilled in the art will appreciate various arrangements and configurations for the braze materials, and various combinations of metals and/or alloys, are within the scope of this disclosure.

The present disclosure also provides a detailed process, in particular, a detailed brazing process, to yield an optimum braze joint for end cover assemblies. A manufacturing process plan is needed before the operation to define all the material and operation limits and requirements.

Figure 6:
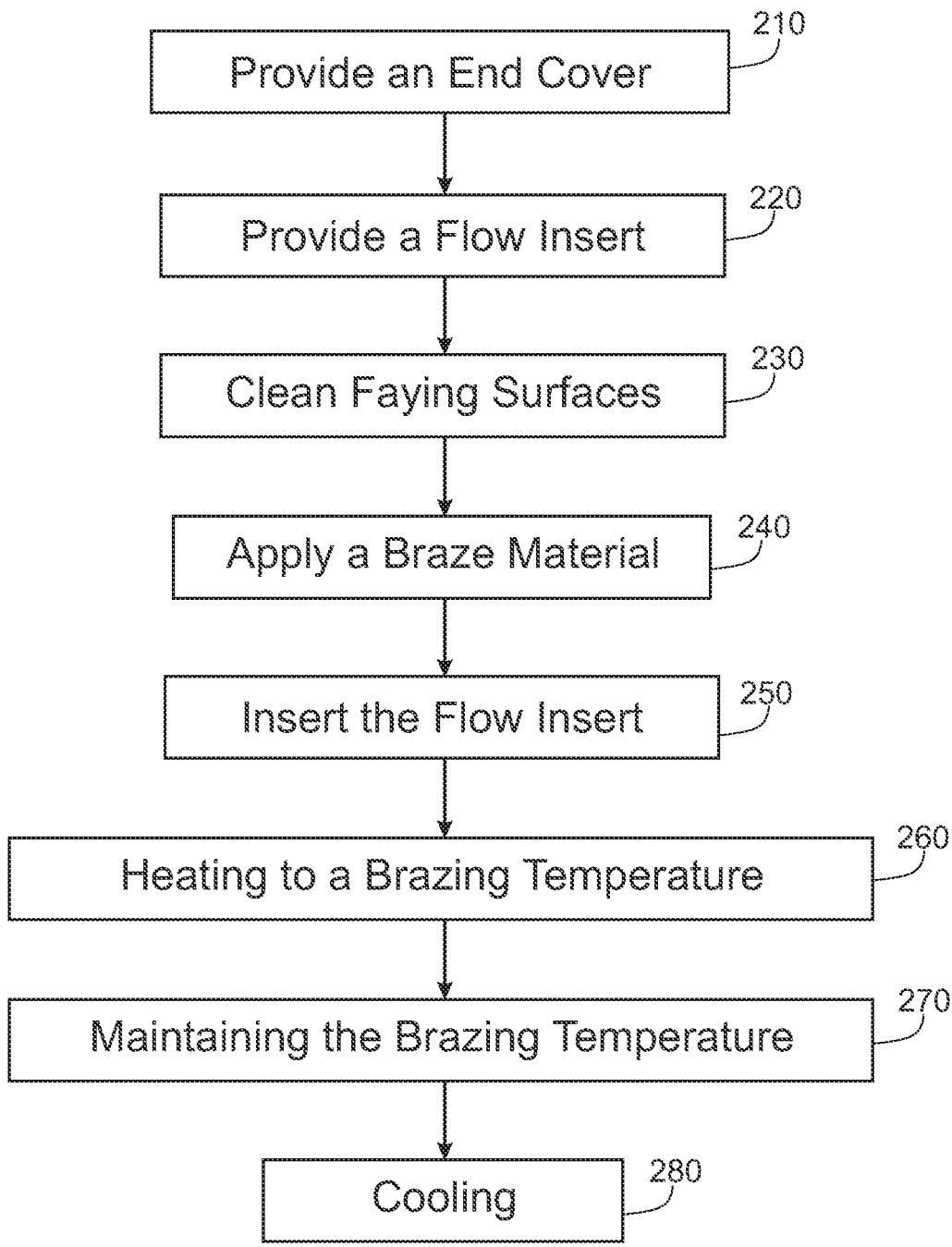
FIG. 6 is a flowchart depicting sample sequence of steps which may be practiced in accordance with a method of the present disclosure.

Referring to FIG. 6, a diagram is illustrated for a method 200 for brazing a flow insert into an end cover to form a brazed end cover assembly according to the present disclosure. Method 200 may include steps 210-280 and may initially involve providing an end cover (step 210) and providing a flow insert (step 220) described above in the present disclosure. There are at least first and second gaps between the end cover and the flow inserts.

Before the flow inserts 14 are brazed into the end cover 12, all parts, fixtures and braze joint regions should be suitably cleaned and degreased (step 230). The cleaning may remove all surface dirt, oil, or other foreign matter that could adversely affect the quality or service performance of the brazed assemblies or furnace components. For example, the cleaning could be effected using a clean stainless steel brush followed by wiping with a suitable solvent. The faying surfaces to be brazed may be vacuum heat-treated before brazing for the purposes of final cleaning to remove surface oxides.

To provide a desired braze point, in accordance with the disclosure, the machine finish of the end cover opening and flow insert diameter faying surfaces may be in the range of 32 to 63 finish, inclusive.

Following cleaning, all the end cover 12 and the flow inserts 14 may be suitably sealed, for example in plastic bags, to protect them from contamination prior to brazing. Moreover, the operator should wear protective garments, such as clean white cotton gloves, to handle all assembly parts during operations after the cleaning step to avoid re-contamination of the brazing surface.

When choosing the optimum braze gap dimensions, a person skilled in the art should consider factors, including but not limited to, the form of the brazing filler material, the thickness of the end cover plate, the materials used in end cover and the flow insert, and the sensitivity and operating principle for the braze joint inspection machine. To confirm that a suitable braze gap is defined by the parts, all braze gaps should be calculated immediately prior to brazing.

The braze filler material is Au—Ni alloy as described above, in either wire, paste or foil forms. Braze filler may be placed (step 240) prior to brazing on the flow inserts near or at the locus of the braze joints 72 and 74, shown in FIG. 5. Stop-off may be applied as required to restrict the flow of braze filler away from the joint areas. Then inserting the flow insert with the braze material applied thereto into to receiving inner hole of the end cover (step 250).

Once cleaned, sealed, measured and prepared, brazing may then be performed in accordance with predetermined manufacturing process plan using a vacuum furnace brazing process with a pressure no higher than about $1 \times 10^{-3}$ Torr (1 micron). In so doing, fixtures may be used when required to support and restrain end cover assemblies during brazing in order to maintain end cover assembly dimensions within the required limits. Moreover, the end cover assemblies may be positioned in the furnace such that the braze flow direction conforms with the manufacturing process plan, such that uniform heating is achieved throughout all end cover assemblies, and such that the braze joint quality requirements are satisfied.

The end cover assembly may then be heated to the brazing temperature at controlled rates (step 260) and with thermal holds as specified in the manufacturing process plan (step 270). In an exemplary embodiment, to provide an acceptable braze joint embodying the disclosure, a range of peak brazing temperatures may be determined, as well as the duration at each corresponding peak temperature. For example, the peak brazing temperature may be neither less than 2075° F. nor greater than 2175° F., but other temperature ranges are possible. Moreover, the time at peak temperature may be between 20 and 60 minutes. Suitably placed thermocouples may be used to determine process temperatures.

After completing the brazing process, the resulting brazed end cover assembly may be cooled down to a predetermined end temperature at a predetermined rate (step 280). In an exemplary embodiment, the cooling rate may also be controlled. More particularly, the end covers may be cooled from the peak temperature to 1750° F. at a rate no greater than 7.5 degrees per minute, whereas the cooling rate from 1500° F. to 1000° F. may be about 10-20 degrees per minute. Again, other ranges and rats are possible. Further cooling may be continued until reaching room temperature. Inert gas may be used during the cooling process.

Once cooled, it is permissible to repair or correct defective braze joints that do not meet inspection criteria by re-application of braze filler material, if required, and a single re-braze cycle.

After brazing is complete, a post braze surface treatment is permissible, if deemed necessary or desirable. Thus, the cosmetic surface appearance of brazed assemblies may be enhanced by the use of pressure blasting with 100 mesh glass beads, provided that conditions that would result in damage to, or removal of, braze filler material or creation or concealment of defects is avoided. Blasting pressure should not exceed 80 psi, and stand-off distances should not to be less than six inches.

Inspection of the brazed assembly may then be carried out using conventional machines. For example, an X-ray machine may be used to identify braze voids in the resulting brazed end cover assembly.

INDUSTRIAL APPLICABILITY

From the foregoing, it can be seen that the present disclosure describes a fuel nozzle end cover assembly using Au—Ni braze used in industrial gas turbines. Further, the present disclosure sets forth a method of producing the disclosed fuel nozzle end cover assembly. Such a method may find industrial applicability in many applications including, but not limited to, aerospace applications such as fuel nozzle end covers for gas turbine engines.

Conventional gas turbine might have 14 fuel nozzle end covers, each of which might have 20 or more braze joints. By combining the strengths of an enabling braze material in Au—Ni braze and the advantageous physical property of Au when the braze is inspected by an X-ray inspection machine, the present disclosure provides a novel process to make a better performing and easy-to-inspect end cover assembly. The present disclosure provides novel alternatives to the present braze material and brazing method for end cover assemblies in order to meet advanced requirements for brazing quality in end cover assemblies. With the present novel process, a fuel nozzle end cover is produced which has increased ductility and better control of brazing quality, both of which contribute to higher engine performance. Moreover, using the novel process to manufacture a fuel nozzle end cover according to the present disclosure opens up new possibilities for gas turbine engine inspection which have heretofore been limited by conventional Ni brazes, and which may reduce repair costs and costs associated with defected end cover assembly and turbine failures.

While the invention has been described with reference to certain embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A brazed end cover assembly for a gas turbine combustor, comprising:
   an end cover having first and second surfaces and having a plurality of openings for receiving a flow insert extending between said surfaces, said opening having a stepped inner hole so as to have at least first and second inner diameters;
   a flow insert for being received in said stepped inner hole, said flow insert having first and second ends and a nozzle hole defined therethrough, and an outer surface of said flow insert being stepped so as to have at least first and second outer diameters generally corresponding to said inner diameters of said inner hole of said end cover;
   a first gap between said first inner diameter of said inner hole and said first outer diameter of said flow insert;
   a second gap between said second inner diameter of said inner hole and said second outer diameter of said flow insert;
   a first braze joint formed at said first gap using a first braze material, said first braze material consists of Au and Ni or Au, Ni, Cu, Cr and B, said first braze material including no less than 65% Au and having a melting range between about 1742 F and 1814 F; and
   a second braze joint formed at said second gap using a second braze material, said second braze material consists of Au and Ni, or Au, Ni, Cu, Cr and B, said second braze material including no less than 65% Au and having a melting range between about 1742 F and about 1814 F.

2. The brazed end cover assembly of claim 1, wherein said flow insert and said end cover are formed from stainless steel.

3. The brazed end cover assembly of claim 1, further comprising at least first and second fluid inlets extending from said second surface.

4. The brazed end cover assembly of claim 3, further comprising:
   a first manifold which is in fluid communication with said first fluid inlet; and a second manifold which is in fluid communication with said second fluid inlet.

5. The brazed end cover assembly of claim 1, wherein said first and second braze materials comprise no more than 35% Ni.

6. The brazed end cover assembly of claim 1, wherein said first and second braze materials comprise no less than 75% Au and no more than 25% Ni.

7. A gas turbine engine comprising: a compressor;
   a plurality of combustors; and a turbine;
   wherein said combustor has a brazed end cover assembly, said brazed end cover assembly comprising:
   an end cover having first and second surfaces and having a plurality of openings for receiving a flow insert extending between said surfaces, said opening having a stepped inner hole so as to have at least first and second inner diameters;
   a flow insert for being received in said stepped inner hole, said flow insert having first and second ends and a nozzle hole defined therethrough, and an outer surface of said flow insert being stepped so as to have at least first and second outer diameters generally corresponding to said inner diameters of said inner hole of said end cover;
   a first gap between said first inner diameter of said inner hole and said first outer diameter of said flow insert;
   a second gap between said second inner diameter of said inner hole and said second outer diameter of said flow insert;
   a first braze joint formed at said first gap using a first braze material, said first braze material consists of Au and Ni or Au, Ni Cu, Cr and B, said first braze material including no less than 65% Au and having a melting range between about 1742 F and about 1814 F; and
   a second braze joint formed at said second gap using a second braze material, said second braze material consists of Au and Ni or Au, Ni Cu, Cr and B, said second braze material including no less than 65% Au and having a melting range between about 1742 F and about 1814 F.

8. The gas turbine engine of claim 7, wherein said flow insert and said end cover are formed from stainless steel.

9. The gas turbine engine of claim 7, said brazed end cover assembly further comprising at least first and second fluid inlets extending from said second surface.

10. The gas turbine engine of claim 9, said brazed end cover assembly further comprising:
    a first manifold which is in fluid communication with said first fluid inlet; and
    a second manifold which is in fluid communication with said second fluid inlet.

11. The gas turbine engine of claim 7, wherein said first and second braze materials comprise no more than 35% Ni.

12. The gas turbine engine of claim 7, wherein said first and second braze materials comprise no less than 75% Au and no more than 25% Ni.

13. A method for brazing a flow insert into an end cover to form a brazed assembly, comprising:

providing an end cover having first and second surfaces and having a plurality of openings for receiving an insert structure extending between said surfaces, said opening having a stepped inner hole so as to have at least first and second inner diameters;

providing a flow insert for being received in a respective said hole, said flow insert having first and second ends and a nozzle hole defined therethrough, and an outer surface of said flow insert being stepped so as to have at least first and second outer diameters generally corresponding to said inner diameters of said inner hole of said end cover;

wherein there is a first gap between said first inner diameter of said inner hole and said first outer diameter of said flow insert, and, wherein there is a second gap between said second inner diameter of said inner hole and said second outer diameter of said flow insert;

cleaning said end cover and said flow insert;

applying a braze material to pre-determined circumferential portions of said outer surface of said flow insert, said braze material consists of Au and Ni or Au, Ni Cu, Cr and B, the braze material comprising no less than 65% Au and having a melting range between about 1742 F and about 1814 F;

inserting said flow insert with said braze material applied thereto into said respective inner hole of said end cover;

heating the assembly of said flow insert and said end cover to a brazing temperature;

maintaining said brazing temperature for a pre-determined time; and cooling said assembly of said flow insert and said end cover from said brazing temperature to a predetermined end temperature at a pre-determined rate.

14. The method of claim 13, wherein said cleaning comprises vacuum heating at least the surfaces to be razed to remove surface oxide.

15. The method of claim 13, wherein said braze material is a braze wire.

16. The method of claim 13, wherein said braze material is selected from a group consisting of a braze foil, a braze paste, and combinations thereof.

17. The method of claim 13, wherein said braze material comprises no more than 45% Ni.

18. The method of claim 13, wherein said braze material comprises no less than 75% Au and no more than 25% Ni.

19. The method of claim 13, further comprising inspecting the brazed joints of said assembly, determining defective braze joints, and repairing said defective braze joints by re-applying said braze material and re-brazing said assembly.

20. The method of claim 19, wherein said inspecting comprises X-ray inspection.

* * * * *